United States Patent [19]

Tate

[11] 4,256,491

[45] Mar. 17, 1981

[54] WATERPROOFING COMPOSITION AND METHOD OF MAKING THE SAME

[75] Inventor: Dan C. Tate, Canton, N.C.

[73] Assignee: Champion International Corporation, Stamford, Conn.

[21] Appl. No.: 20,257

[22] Filed: Mar. 14, 1979

Related U.S. Application Data

[63] Continuation of Ser. No. 829,867, Sep. 1, 1977, abandoned.

[51] Int. Cl.³ .................... C08L 1/00; C08L 97/02; C09K 3/18
[52] U.S. Cl. .................... 106/2; 106/202; 106/204; 106/274; 106/275; 106/123 TQ; 162/100; 162/189
[58] Field of Search ............... 162/100, 171, 189–191; 106/123, 274, 275, 2, 282, 284, 202, 204; 260/97.7

[56] References Cited

U.S. PATENT DOCUMENTS

| | | | |
|---|---|---|---|
| 1,310,376 | 7/1919 | Schorger | 162/171 |
| 2,434,243 | 1/1948 | Hjelte | 106/134 |
| 3,216,888 | 11/1965 | Cacossa et al. | 162/171 |
| 3,895,997 | 7/1975 | Haywood | 162/100 |

*Primary Examiner*—Theodore Morris
*Attorney, Agent, or Firm*—Evelyn M. Sommer

[57] ABSTRACT

A waterproofing composition is made by admixing primary sludge produced by pulp and paper mill operations with tall oil pitch. The composition may include particulate wood by-products as fillers and a material such as lime for raising the softening point of the tall oil pitch.

14 Claims, No Drawings

WATERPROOFING COMPOSITION AND METHOD OF MAKING THE SAME

This is a continuation of application Ser. No. 829,867, filed Sept. 1, 1977 now abandoned.

BACKGROUND OF THE INVENTION

The present invention relates to waterproofing compositions and more particularly to a method of making such compositions from the by-products of pulp and paper mill operations.

In the manufacture of paper products, by-products are produced which are of limited usefulness or which present disposal problems.

One example of such a by-product is primary sludge resulting from pulp or paper mill operations. While the composition of such sludge will vary to some extent depending upon the particular type of operation carried out at the pulp or paper mill, 20% or more of the volume of such sludge is made up of wood fibers. The sludge typically also includes wood fines, bark pieces, wood dust, water, and other materials such as lime, clay, paper fillers and titanium dioxide. Inorganic materials, which may constitute up to half of the sludge, can include nitrogen, phosphorus pentoxide, calcium, aluminum, and small amounts of a number of other naturally-occurring elements.

The principal method of disposing of primary sludge has been by landfill disposal. However, that method of disposal gives rise to a risk that environmentally-harmful materials may be leached from the primary sludge. The sludge itself can have a relatively high mositure content. Even if it does not, improper operation of the landfill, such as improper grading or infrequent application of cover material, can allow rain or ground water to leach materials from the sludge.

The use of the landfill method of operation is undesirable for other reasons. The cost of operating the landfill, including the cost of acquiring suitable land, can be nearly prohibitive. In addition, the costs of hauling the sludge to the landfill can be quite high.

Another example of a by-product from paper and pulp manufacturing operations is tall oil pitch. Tall oil is a resinous by-product from the manufacture of chemical wood pulp. This by-product is used in the manufacture of such products as soaps, coatings and oils. Tall oil pitch is a non-distillable residue left from the fractionation of tall oil. The pitch, which is removed from the base of a stripping tower during a flash distillation step, is a semi-fluid, tar-like material containing most of the higher alcohols and sterols from the original crude tall oil along with rosin and fatty acids. A typical tall oil pitch material may include 12–30% rosin acids and esters, 35–50% fatty acids and esters and 20–35% neutral materials. Tall oil pitch is readily soluble in aliphatic and aromatic hydrocarbons and is compatible with a variety of oils, asphalts and rosins. Typical properties of tall oil pitch are:

| | |
|---|---|
| Color, Gardner, 5% in benzene | 11–18 |
| Acid Number | 20–60 |
| Saponification Number | 80–135 |
| Specific Gravity @ 25° C. (77° F.) | 0.990–1.010 |
| Softening Point | 25°–55° C. (77°–131° F.) |
| Flash Point (Open Cup) | 260°–271° C. (500°–520° F.) |

SUMMARY OF THE INVENTION

The present invention makes use of primary sludge produced in the course of pulp and paper mill operations and tall oil pitch. The two products are admixed to produce a waterproofing composition which can be spread onto a surface to be protected or formed into sheets.

DETAILED DESCRIPTION

In making a waterproofing material in accordance with the present invention, the primary sludge produced in the course of pulp and paper mill operations will normally have water added thereto to convert the sludge to a workable mass. When the water and sludge have been thoroughly mixed, tall oil pitch which has been heated to above its softening point can be added to the sludge and the mixing continued for a sufficient period of time to thoroughly admix the two components of the composition.

The unsaturated fatty acids content of the tall oil pitch can be increased to improve the adhesive properties of the composition since such acids will allow the composition to more easily wet any surface to which it is applied.

Lime can be added to the tall oil pitch in order to raise the softening point of the pitch. Particulate wood by-products, such as ground bark or wood flour or an admixture of the two, can be added to the composition as a filler. Sulfur can also be added as a catalyst to accelerate the disproportionation of the rosin in the tall oil pitch.

The consistency of the waterproofing composition may have to be adjusted depending upon the solids content of the starting materials. In general, the solids content of the composition can range from about 12% to 20% by weight of the total composition. The primary goal of any consistency adjustment is to achieve blending or mixing of the components without a great deal of difficulty. The sulfur which reacts with the unsaturated fatty acids can be added in amounts which depend upon the acid content of the pitch. Generally, about 14–17 grams of sulfur can be added per pound of pitch.

The relative amounts of tall oil pitch and primary sludge which are used can vary widely. In a preferred embodiment of the invention, the volume of tall oil pitch which is employed can range from about 90%–110% of the volume of primary sludge employed.

A waterproofing composition prepared in accordance with the present invention can be applied in the same manner as any other conventional waterproofing compound. The material can be applied with a trowel to walls of masonry construction or can be formed into sheets. Of course, the composition should be allowed to dry before exposure to significant amounts of water.

The invention will be better understood by reference to the specific example described hereinbelow. Unless otherwise stated, all percentages and parts are by weight.

EXAMPLE

Water was added to 400cc. of primary sludge waste to adjust the solids content of the sludge to 15.8%. 400 cc. of hot tall oil pitch, which had previously been reacted with 15 grams of sulfur, was added to the primary sludge with continuous mixing. After the mass had been thoroughly mixed, samples of the resulting composition were spread with a trowel on pieces of concrete block. Some of the composition was spread into the form of a sheet. After drying at room temperature, the sheet was tested under water for a period of six weeks. No penetration was observed. The material was then tested under 18 inches of vacuum. No penetration of water or mositure was observed.

While there has been described what is considered to be a preferred embodiment of the invention, variations and modifications therein will occur to those skilled in the art once they become acquainted with the basic concepts of the invention. For example, while tall oil pitch is a preferred material because it is inexpensive, available, and works well, other high melting asphalt tars might be employed alone or in a mixture including tall oil pitch. Therefore, it is intended that the appended claims shall be construed to include all such variations and modifications as fall within the true spirit and scope of the invention.

What is claimed is:

1. A waterproofing composition consisting essentially of a mixture of primary sludge produced in the course of pulp and paper mill operations, at least 20 volume percent of which is wood fibers, and tall oil pitch.

2. A waterproofing composition as recited in claim 1 wherein the primary sludge includes, moisture and inorganic materials.

3. A waterproofing composition as recited in claim 1 wherein the volume of tall oil pitch is in the range of 90%–110% of the volume of primary sludge.

4. A waterproofing composition as recited in claim 3 further including particulate wood by-products as a filler.

5. A waterproofing composition as recited in claim 4 wherein the particulate wood by-product is selected from the group consisting of ground bark, wood flour and admixtures thereof.

6. A waterproofing composition as recited in claim 3 further including a material for raising the softening point of the tall oil pitch.

7. A waterproofing composition as recited in claim 6 wherein the material is lime.

8. A waterproofing composition as recited in claim 3 further including sulfur.

9. A method of making a waterproofing composition consisting essentially of the steps of:
   (a) forming a mixable mass by adding water to primary sludge produced in the course of pulp and paper mill operations; and
   (b) blending the mixable mass with heated tall oil pitch.

10. A method of making a waterproofing composition as recited in claim 9 wherein the volume of tall oil pitch is in the range of 90%–110% of the volume of primary sludge.

11. A method of making a waterproofing composition as recited in claim 9 including the additional step of mixing lime with the tall oil pitch to raise the softening point thereof.

12. A method of making a waterproofing composition as recited in claim 9 including the additional step of adding a particulate wood by-product to the mixture as a filler.

13. A method of making a waterproofing composition as recited in claim 9 including the additional step of adding sulfur thereto.

14. A method of making a waterproofing composition comprising the steps of:
   (a) supplying a quantity of paper sludge produced in the course of pulp and paper mill operations;
   (b) adding a quantity of water to said quantity of paper sludge to form a mixable mass;
   (c) supplying a quantity of tall oil pitch;
   (d) heating the quantity of tall oil pitch supplied in step (c);
   (e) mixing the quantity of tall oil pitch heated in step (d) with the mixable mass formed in step (b).

* * * * *